April 29, 1924.　　　　E. H. KOENIG ET AL　　　　1,491,914
ANTISKID LUG
Filed Nov. 9, 1922

Inventors
Emil H. Koenig
Frederick Camp

By
Hardway & Cathy
Attorneys

Patented Apr. 29, 1924.

1,491,914

UNITED STATES PATENT OFFICE.

EMIL H. KOENIG, OF HOUSTON, AND FREDERICK CAMP, OF IOWA COLONY, TEXAS.

ANTISKID LUG.

Application filed November 9, 1922. Serial No. 599,740.

*To all whom it may concern:*

Be it known that we, EMIL H. KOENIG and FREDERICK CAMP, citizens of the United States, residing at Houston, in the county of Harris, and Iowa Colony, in the county of Brazoria, respectively, in the State of Texas, have invented certain new and useful Improvements in Antiskid Lugs, of which the following is a specification.

This invention relates to new and useful improvements in an anti-skid lug.

One object of the invention is to provide an anti-skid lug adapted to be applied to the traction wheels of a motor vehicle, when negotiating muddy or slippery roads, to prevent the spinning of said wheels or the skidding of the vehicle.

Another object of the invention is to provide an anti-skid lug which is applied to the outer edge of the wheel rim and which will not clamp around the tire or injure the same.

A further feature resides in the provision of a detachable fin, adapted to be applied to the lug, if necessary, to prevent the skidding or side slipping of the vehicle.

A still further feature of the invention resides in the provision of a device of the character described which is of simple construction, which may be cheaply and easily manufactured, and easily applied.

With the above and other objects in view this invention has particular relation to certain novel features of construction, arrangement of parts, and use, an example of which is given in this specification and illustrated in the accompanying drawings, wherein:—

Figure 4:
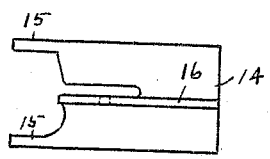
Figure 4 shows a side view of an antiskid fin employed.
Figure 5:
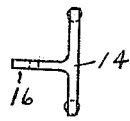
Figure 5 shows an end view thereof.
Figure 3:
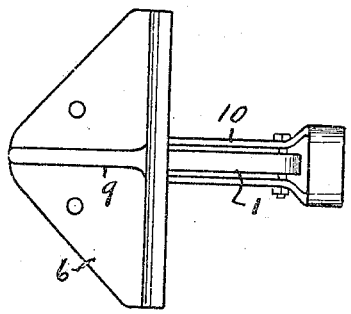
Figure 3 shows a bottom plan view with the fin omitted.
Figure 1:
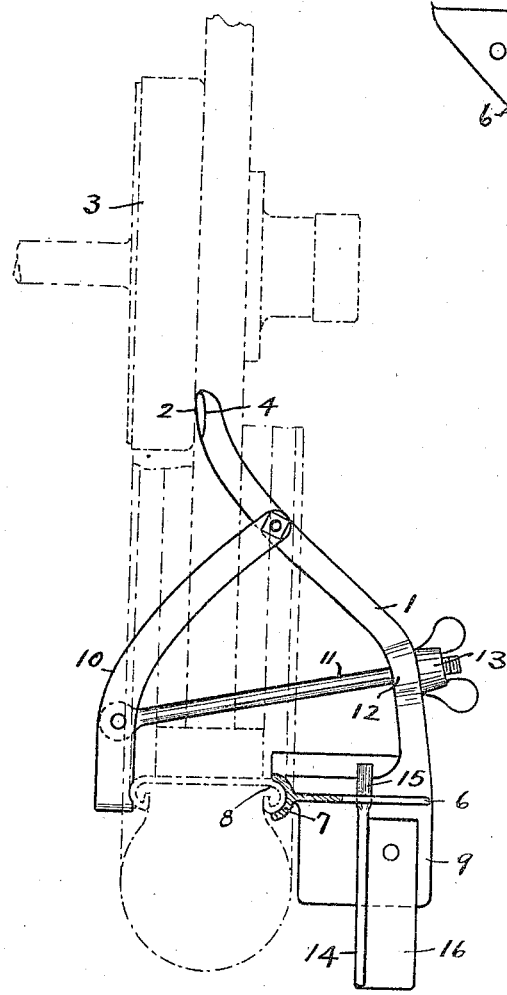
Figure 1 shows a side view of the device as applied to a wheel.
Figure 2:
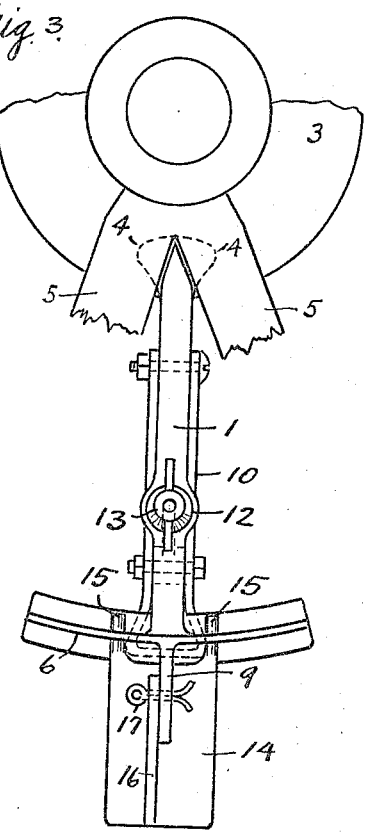
Figure 2 shows a front view.

Referring now more particularly to the drawings the numeral 1 designates a clamp arm one end of which has a flat face 2 designed to rest against the outside of the brake drum 3 of the vehicle traction wheel. This end of said lever has the lateral flanges 4, 4 designed to engage behind the wheel spokes 5, 5 between which said end of the lever is inserted. This lever is curved outwardly and its outer end is formed with a wide arcuate flange 6 whose inner edge has the groove 7 provided to receive the outer edge of the wheel rim 8. The flange 6 carries an outwardly projecting, or radial, fin 9 designed to cut down into the road surface to prevent spinning of the wheel.

Pivoted at one end, to the clamp arm 1, there is a clamp lever 10 which projects through between said spokes 5, 5 and whose other end is designed and disposed to clamp against the inner edge of said rim 8. A clamp rod 11 is pivoted at one end to the lever 10 and its other end works through a bearing 12 of the arm 1 and is threaded to receive a nut 13 by means of which said lever and arm may be clamped and secured on said rim.

One or more of the lugs may be secured to a wheel and when so secured will enable the vehicle to pull through mud or over slippery roads. It is to be observed that the lug does not clamp around the tire but is located on the outside thereof and will not injure the tire. When hard surfaced roads are encountered the lug will be held clear of the surface by the tire and consequently need not be removed until the trip is completed or until there is no further immediate need of it.

In case the contour of the road is such as to cause side slippage of the vehicle there is a supplemental fin 14 which may be used. This fin 14 has two prongs 15, 15 which may be fitted through holes in the flange 6 and the fin 14 has a flange 16 at right angles thereto which will then lie alongside the fin 9 and may be secured in place by a cotter pin 17 passing through said flange and fin. The fin 14 is so disposed with relation to course of travel of the wheel as to prevent the side slipping of said wheel.

What we claim is:—

A device of the character described including a clamp arm, a flange carried by one end thereof, and formed with a marginal groove designed to receive one edge of a wheel rim, lateral flanges carried by the other end thereof to engage with the wheel spokes, a projecting fin carried by the flange, a clamp lever pivoted at one end to said arm and whose other end is formed to engage against the other edge of said rim, means connecting said arm and lever to clamp them in fixed position.

In testimony whereof we have signed our names to this specification in the presence of two subscribing witnesses.

EMIL H. KOENIG.
FREDERICK CAMP.

Witnesses for Emil H. Koenig:
E. V. HARDWAY,
W. H. DUNLAY.

Witnesses for Frederick Camp:
ANNA L. FORD,
EMERY E. FORD.